United States Patent

[11] 3,619,524

[72] Inventor Arden G. Gillund
 Oak Creek, Wis.
[21] Appl. No. 35,674
[22] Filed May 8, 1970
[45] Patented Nov. 9, 1971
[73] Assignee General Motors Corporation
 Detroit, Mich.

[54] SENSOR
 4 Claims, 3 Drawing Figs.

[52] U.S. Cl. ............................................ 200/61.45,
 200/52, 340/262
[51] Int. Cl. ........................................... H01h 35/02
[50] Field of Search ................................. 340/262;
 200/61.45, 61.46, 61.47, 61.48, 61.49, 61.51,
 61.52, 61.53, 52, 166.1, 166 F, 163

[56] References Cited
 UNITED STATES PATENTS

| | | | |
|---|---|---|---|
| 2,997,557 | 8/1961 | Gillmor et al. | 200/61.45 |
| 2,890,303 | 6/1959 | Clurman | 200/61.45 |
| 2,892,049 | 6/1959 | Rubinstein | 200/61.45 |
| 2,898,415 | 8/1959 | Clurman | 200/61.53 |
| 2,888,530 | 5/1959 | Horton | 200/61.45 |

Primary Examiner—J. V. Truhe
Assistant Examiner—George A. Montanye
Attorneys—W. E. Finken and Herbert Furman ABSTRACT: A sensor includes a cylindrical housing having an apertured planar base wall and contact plate. An axial pole magnet is mounted on the base wall and located normal to the aperture. The magnetic flux of the magnet maintains a ball in seated relationship within a ball seat provided by the embossed opening of the apertured plate. The OD of the ball is greater than that of the magnet. A contact ring is mounted on a circular sidewall of the housing and includes a peripheral series of integral cantilevered thin flexible axially tapered spring fingers which extend radially of the ball seat and overlie the contact plate in spaced relationship. The distal portions of the fingers terminate radially outwardly of the ball seat and are spaced from the contact plate a distance greater than the OD of the ball. An intermediate portion of each finger is spaced from the contact plate a distance substantially equal to the OD of the ball. The contact plate and the contact ring are connected to a source of power and a mechanism to be actuated. Upon an acceleration pulse of predetermined amplitude and time being applied to the ball, the ball moves radially outwardly of the ball seat and into wiping engagement with the contact plate and at least one of the spring fingers to complete the circuit across the source of power and the mechanism to be actuated. The wiping engagement of the ball with the intermediate portion of the one finger flexes the one finger about its proximal portion and creates a spring biasing force returning the ball toward the ball seat when the acceleration pulse is reduced. A cover for the housing seats on the sidewall and includes a stop projecting transverse of the distal portion of the fingers and overlying the ball seat to limit movement of the ball axially of the seat.

PATENTED NOV 9 1971

3,619,524

INVENTOR.
Arden G. Gillund
BY
Herbert Furman
ATTORNEY

SENSOR

This invention relates to sensors and more particularly to sensors of the type including a ball retained in a predetermined position by magnetic flux and being movable to a position completing an electrical circuit when subjected to an acceleration pulse of predetermined amplitude and time.

One of the features of the sensor of this invention is that the ball is retained within a ball seat on a planar surface by magnetic flux and is movable radially of the ball seat when subjected to an acceleration pulse of predetermined amplitude and time into wiping engagement with an intermediate portion of at least one of a plurality of axially tapered cantilevered spring fingers and a conductive area on the planar surface to close a circuit between the one spring finger and conductive area and actuate a mechanism. Another feature of this invention is that the wipingly engaged spring finger flexes about its proximal portion when wipingly engaged by the ball to create a biasing force returning the ball toward the ball seat upon reduction or cessation of the acceleration pulse. A further feature of this invention is that the wiping engagement of the ball with the spring fingers and the conductive area of the planar surface continuously maintains a clean surface for excellent electrical contact. Yet another feature of this invention is that a stop limits movement of the ball axially of the ball seat. Yet a further feature of this invention is that the spring fingers are located generally radially of the ball seat and the intermediate portions of the fingers may be at the same distance or different distances from the ball seat to thereby provide equal or varying integrated distances for the ball. These and other features of the sensor of this invention will be readily apparent from the following specification and drawings wherein:

Figure 1:
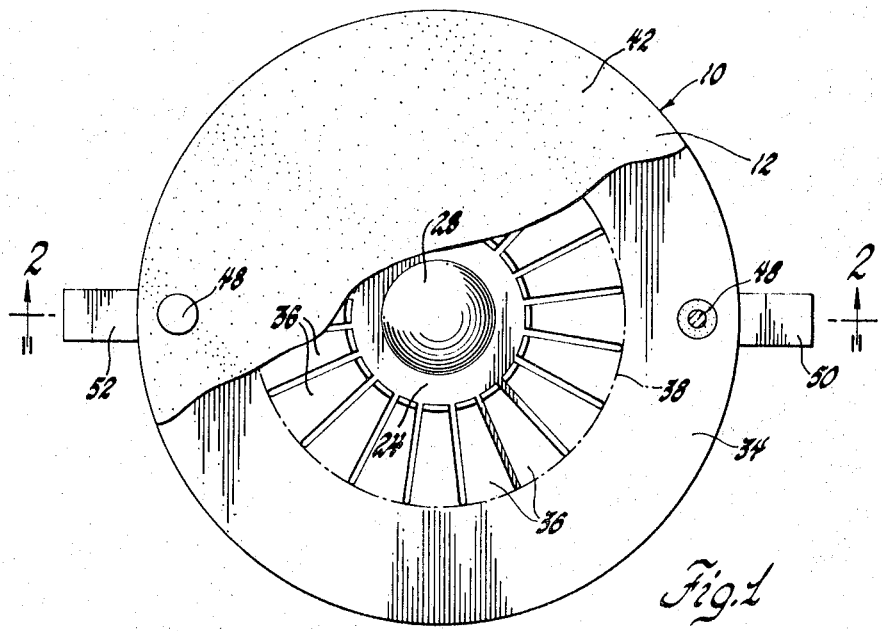
FIG. 1 is a partially broken away top plan view of a sensor according to this invention in unactuated position.
Figure 2:
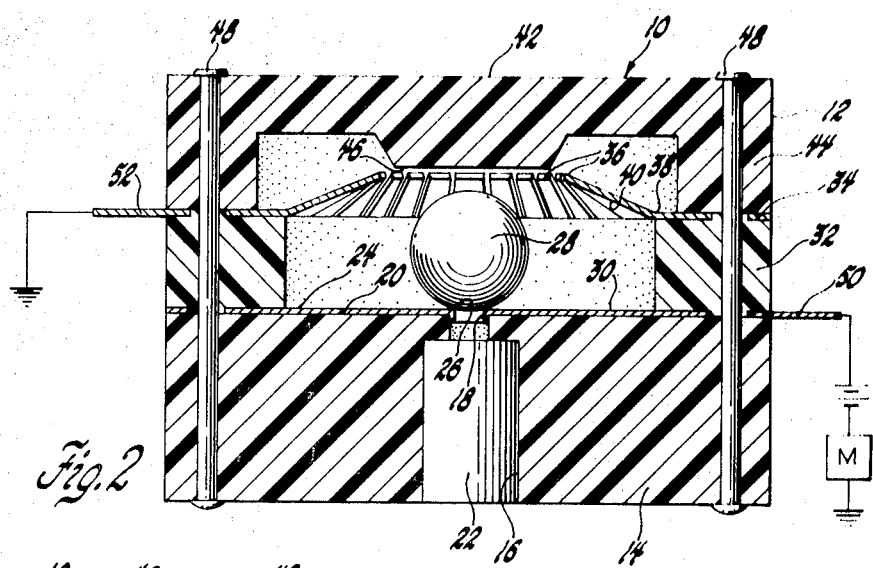
FIG. 2 is an enlarged cross-sectional view taken generally along the plane indicated by line 2—2 of FIG. 1.

Referring now to FIGs. 1 and 2 of the drawings, a sensor 10 according to this invention includes a closed housing designated generally 12. The housing 12 includes a circular base member 14 of plastic or other insulating material having a central bore 16 which opens through a smaller diameter bore 18 to the upper planar wall or surface 20 of the member 14. An axial pole magnet 22 fits within the bore 16 and is suitably secured therein as by cementing. In the specific embodiment shown, the north pole of the magnet is located adjacent the aperture 18 although the poles of the magnet can be reversed if desired.

A circular contact plate 24 of electrically conductive material seats on the wall 20 and includes a central opening having an embossed edge opening to the aperture 18 and providing a ball seat 26. A ball 28 of magnetic electrically conductive material is seated on the seat 26. The OD of the ball is greater than that of the magnet 22. The magnetic flux of the magnet 22 normally holds the ball on seat 26 against movement along the upper planar wall or surface 30 of plate 24.

A circular spacer ring 32 of insulating material seats on the edge portion of plate 24. A circular contact ring 34 seats on the upper wall of the ring 32. A circumferential series of like adjacent spaced axially tapered spring fingers 36 extend generally radially of the ring and of the ball seat 26. The proximal portions of the spring fingers are integrally joined to ring 34 at 38 and cantilever the fingers in overlying angularly spaced relationship to surface 30. Preferably the angle between each finger and the surface 28 is at least 10°. The free ends or distal portions of the fingers 36 terminate radially outwardly of the ball seat 26 and are spaced from the surface 30 a distance greater than the OD of the ball 28. An intermediate portion 40 of each finger is spaced from the surface 30 a distance generally equal to the OD of the ball 28. Preferably the ring 34 and fingers 36 are formed of very thin flexible electrically conductive material, such as beryllium copper or hard-drawn brass.

A circular cover 42 for the housing 10 is formed of insulating material and includes an outer peripheral flange or wall 44 which seats on the ring 34 and a central annular embossment or stop 46 which axially overlies the ball seat 26 and is located immediately adjacent the ball 28 for a purpose to be described. Rivets 48 extend through aligned apertures in the wall 44 of cover 42, ring 34, spacer 32, plate 24 and base 14 to maintain the sensor parts in assembled relationship. The plate 24 and the ring 34 include respective contact terminals 50 and 52. As shown, terminal 52 is grounded and terminal 50 is connected to a battery or other source of power and a mechanism M to be actuated by the sensor.

Under acceleration impulses of predetermined amplitude and time applied generally coaxial of the sensor, or normal to surface 30, the ball 28 may move axially of the seat 26 against the flux of magnet 22, but will immediately engage the embossment 46 to stop such movement of the ball and immediately return it in seated relationship on the ball seat 26.

Figure 3:
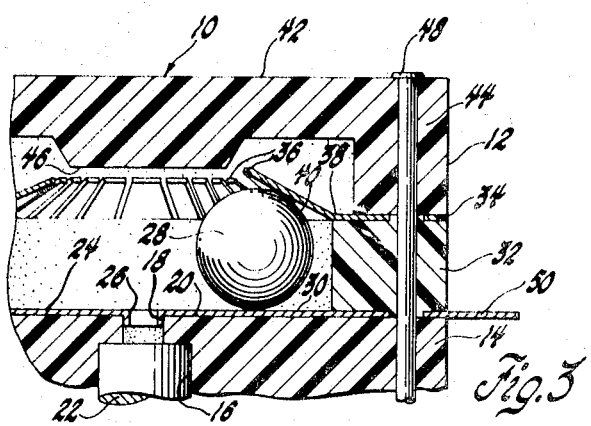
FIG. 3 is a view similar to FIG. 2 showing the sensor in actuated position.

When an acceleration pulse of predetermined amplitude and time is applied generally normal to the axis of the sensor, or horizontally as viewed in FIG. 2, the ball 28 will move radially of the ball seat 26 and along the surface 30 against the flux of magnet 22. The ball will freely move underneath the distal portion of at least one of the fingers 36 and then move into wiping engagement with the intermediate portion 40 of the one finger and with the surface 30 as shown in FIG. 3. This completes the circuit and actuates the mechanism M controlled by the sensor 10.

The wiping engagement of the ball 28 with the one finger 36 flexes the one finger about the proximal portion thereof as shown in FIG. 3. Each finger functions as an individual tapered leaf spring member and flexing of any one of the fingers by the ball causes the finger to apply a resilient biasing force on the ball which is directed generally radially of the ball seat 26 and returns the ball along surface 30 toward the ball seat when the acceleration pulse is reduced or ceases. As soon as the ball moves toward the ball seat and out of engagement with the flexed finger, the finger will return to its normal position shown in FIG. 2.

The resilient biasing force or output of the engaged finger must be sufficient to return the ball 28 a predetermined distance toward the ball seat 26 so that the magnetic flux of the magnet 22 can reseat the ball.

It is important that the ball 28 wipingly engage the spring fingers 36 to flex such fingers about the proximal portions thereof and yet not wedge between the fingers and the surface 30. While the foregoing description describes the operation of the sensor in terms of engagement of the ball 28 with one of the fingers, it is believed clear that the ball could wipingly engage at least two of the fingers. In such instance the surface of the ball would engage adjacent juxtaposed edges of two of the fingers.

The angle at which the spring fingers 36 extend with respect to the surface 30 will vary with other dimensions of the sensor, such as the spherical diameter of ball 28. It is also important that the ball 28 be of magnetic material but not be a magnet itself.

Although the axially tapered fingers 36 are shown as being arranged in a circular pattern, it is believed clear that they can be arranged in other patterns such as oval, elliptical or irregular. A noncircular pattern of arrangement would provide varying integrated distances between the ball seat and the intermediate portion of certain or all of the spring fingers so that the responsive time of the sensor will vary with the direction of impulse. The integrating distance is the radial distance between the ball seat and the point of tangential engagement of the ball 28 with the surface 30 at the time that the ball 28 initially wipingly engages any one of the fingers.

Likewise, although the plate 24 is shown as being continuous, it is believed apparent that the plate could be segmented and extend underneath the intermediate portions of only certain of the spring fingers to thereby complete the circuit across the sensor 10 only when the acceleration pulses are received in certain directions. Likewise, plate 24 could be omitted and the upper wall 20 of the member 14 could be provided with a printed circuit, either continuous or segmented, to provide for either an omnidirectional sensor or a sensor which will complete the circuit only when the acceleration pulse is received in certain directions.

In the specific embodiment shown, one ball 28 is provided. However, a plurality of balls, preferably three, could be used. Three balls would require a ball seat of larger diameter such that the balls would be tangent to each other within the seat as well as tangentially engage the edge of the seat. In a sensor having a multiplicity of balls, the balls would tend to cancel any resonance by engagement with each other should the acceleration pulses be below the predetermined threshold value or time.

The sensor 10 of this invention is particularly intended for use in an air cushion restraint system for a vehicle. In such a system, a diaphragm-sealed pressure vessel communicates with a manifold which in turn communicates with a cushion or bag intended to be inflated when the vehicle is subjected to certain acceleration pulses. The diaphragm of the pressure vessel is ruptured by one or more squibs which are electrically fired. The sensor 10 could be connected in series with such squibs and a source of power to fire the squibs and release the pressure fluid to inflate the cushion when the ball of the sensor and, of course, the vehicle are subjected to acceleration pulses which exceed predetermined threshold values of both amplitude and time.

Thus, this invention provides an improved sensor.

I claim:

1. A sensor comprising, in combination, a housing including a planar wall, means providing a ball seat on the planar wall, an axial pole magnet located generally normal to the planar wall and communicating with the ball seat, a ball of magnetic electrically conductive material seated on the ball seat, the flux of the magnet holding the ball against movement radially of the ball seat along the planar wall, a series of adjacent flexible spring fingers of electrically conductive material spaced generally laterally of the planar wall and having their proximal portions supported on the housing, the fingers extending generally radially of the ball seat and at predetermined angles to the planar wall, the distal portions of the fingers terminating radially outwardly of the ball seat and being spaced from the planar wall a distance greater than the OD of the ball, an intermediate portion of each finger being spaced from the planar wall a distance generally equal to the OD of the ball, means on the planar wall providing an electrically conductive area under the intermediate portion of each finger, the conductive area under the intermediate portion of each finger, the conductive area and the fingers being adapted to connect a source of power to a mechanism to be actuated by the sensor, an acceleration pulse of predetermined amplitude and time overcoming the flux of the magnet and moving the ball radially of the ball seat along the planar wall, the ball moving underneath the distal portion of at least one finger and into wiping engagement with the conductive area and the intermediate portion of the one finger to connect the source of power to the mechanism to be actuated and to flex the one finger about the proximal portion thereof, the flexing of the one finger providing a resilient biasing force on the ball directed generally radially of the ball seat and returning the ball along the planar wall toward the ball seat upon reduction of the acceleration pulse.

2. A sensor comprising, in combination, a housing including a planar wall having an aperture therethrough, means providing a ball seat on the planar wall adjacent the aperture, an axial pole magnet located generally normal to the planar wall of the housing and communicating with the ball seat through the aperture, a ball of magnetic electrically conductive material seated on the ball seat, the flux of the magnet holding the ball against movement radially of the ball seat along the planar wall, a series of adjacent flexible spring fingers of electrically conductive material spaced laterally of the planar wall and having their proximal portions supported on the housing, the fingers extending generally radially of the ball seat and at predetermined angles to the planar wall, the distal portions of the fingers terminating radially outwardly of the ball seat and being spaced from the planar wall a distance greater than the OD of the ball, an intermediate portion of each finger being spaced from the planar wall a distance generally equal to the OD of the ball, means on the planar wall providing an electrically conductive area under the intermediate portion of each finger, the conductive area and the fingers being adapted to connect a source of power and a mechanism to be actuated by the sensor, an acceleration pulse of predetermined amplitude and time overcoming the flux of the magnet and moving the ball radially of the ball seat along the planar wall, the ball moving underneath the distal portion of at least one finger and into wiping engagement with the conductive area and the intermediate portion of the one finger to connect the source of power to the mechanism to be actuated and to flex the one finger about the proximal portion thereof, the flexing of the one finger providing a resilient biasing force on the ball directed generally radially of the ball seat and returning the ball along the planar wall toward the ball seat upon reduction of the acceleration pulse, and means on the housing overlying the ball seat and limiting movement of the ball axially of the seat.

3. A sensor comprising, in combination, a housing having an annular sidewall and a planar base wall having an aperture therethrough, means providing a ball seat on the planar wall adjacent the aperture, an axial pole magnet located generally normal to the planar wall of the housing and communicating with the ball seat through the aperture, a ball of magnetic electrically conductive material seated on the ball seat, the flux of the magnet holding the ball against movement radially of the ball seat along the planar wall, an annular series of adjacent flexible spring fingers of electrically conductive material peripherally surrounding the ball seat, means mounting the proximal portions of the fingers on the sidewall of the housing to cantilever the fingers over the planar wall at predetermined angles thereto, the distal portions of the fingers being spaced from the planar wall a distance greater than the OD of the ball, an intermediate portion of each finger being spaced from the planar wall a distance generally equal to the OD of the ball, means on the planar wall providing an electrically conductive area under the intermediate portion of each finger, the conductive area and the fingers being adapted to connect a source of power and a mechanism to be actuated by the sensor, an acceleration pulse of predetermined amplitude and time overcoming the flux of the magnet and moving the ball radially of the ball seat along the planar wall, the ball moving underneath the distal portion of at least one finger and into wiping engagement with the conductive area and the intermediate portion of the one finger to connect the source of power and the mechanism to be actuated and to flex the one finger about the proximal portion thereof, the flexing of the one finger providing a resilient biasing force on the ball directed generally radially of the ball seat and returning the ball along the planar wall toward the ball seat upon reduction of the acceleration pulse.

4. A sensor comprising, in combination, a housing including an apertured annular base wall having a planar surface, an annular sidewall extending laterally of the base wall and an annular end wall spaced laterally of the base wall, means providing a ball seat on the base wall adjacent the aperture, an axial pole magnet located generally normal to the planar surface of the housing and communicating with the ball seat through the aperture, a ball of magnetic electrically conductive material seated on the ball seat, the flux of the magnet holding the ball against movement radially of the ball seat along the planar surface, an annular series of flexible spring fingers of electrically conductive material cantilevered on the sidewall and overlying the planar surface, the fingers extending generally radially of the ball seat and at predetermined angles to the planar surface, the distal portions of the fingers terminating radially outwardly of the ball seat and being spaced from the planar surface a distance greater than the OD of the ball, an intermediate portion of each finger being spaced from the planar surface a distance generally equal to the OD of the ball, means on the planar surface providing an electrically conductive area under the intermediate portion of each finger, the conductive area and the fingers being adapted to connect a source of power and a mechanism to be actuated by the sensor, an acceleration pulse of predetermined amplitude and time overcoming the flux of the magnet and moving the ball radially of the ball seat along the planar surface, the ball moving underneath the distal portion of at least one finger and into wiping engagement with the conductive area and the intermediate portion of the one finger to connect the source of power and the mechanism to be actuated and to flex the one finger about the proximal portion thereof, the flexing of the one finger providing a resilient biasing force on the ball directed generally radially of the ball seat and returning the ball along the planar surface toward the ball seat upon reduction of the acceleration impulse, and means on the end wall projecting between the distal portions of the fingers and overlying the ball seat to limit movement of the ball laterally of the ball seat.

* * * * *

PO-1050
(5/69)

UNITED STATES PATENT OFFICE
CERTIFICATE OF CORRECTION

Patent No. __3,619,524__  Dated __November 9, 1971__

Inventor(s) __Arden G. Gillund__

It is certified that error appears in the above-identified patent and that said Letters Patent are hereby corrected as shown below:

Column 3, lines 50 and 51, the following language should be deleted: -- the conductive area under the intermediate portion of each finger, --.

line 53, "to" (first occurrence) should read -- and --.

Signed and sealed this 13th day of June 1972.

(SEAL)
Attest:

EDWARD M. FLETCHER, JR.
Attesting Officer

ROBERT GOTTSCHALK
Commissioner of Patents